US009385871B2

(12) United States Patent
Kang et al.

(10) Patent No.: US 9,385,871 B2
(45) Date of Patent: Jul. 5, 2016

(54) METHOD AND APPARATUS FOR AUTHENTICATING A NON-VOLATILE MEMORY DEVICE

(75) Inventors: Bo-Gyeong Kang, Seoul (KR); Moon-Sang Kwon, Seoul (KR)

(73) Assignee: Samsung Electronics Co., Ltd (KR)

( * ) Notice: Subject to any disclaimer, the term of this patent is extended or adjusted under 35 U.S.C. 154(b) by 93 days.

(21) Appl. No.: 13/478,763

(22) Filed: May 23, 2012

(65) Prior Publication Data

US 2012/0304281 A1 Nov. 29, 2012

(30) Foreign Application Priority Data

May 23, 2011 (KR) .......................... 10-2011-0048634

(51) Int. Cl.
*G06F 21/00* (2013.01)
*H04L 9/32* (2006.01)
*G06F 21/44* (2013.01)
*H04L 9/08* (2006.01)

(52) U.S. Cl.
CPC .............. *H04L 9/3271* (2013.01); *G06F 21/00* (2013.01); *G06F 21/44* (2013.01); *G06F 21/445* (2013.01); *H04L 9/0827* (2013.01)

(58) Field of Classification Search
CPC ............ G06F 12/14; G06F 2221/2129; G06F 2221/21; G06F 2109/60; G06F 21/00; G06F 21/03; G06F 21/123; G06F 21/14; G06F 21/1408; G06F 21/445; G06F 21/10; G06F 2221/2103; G11B 20/00876; G11B 20/00086; H04L 9/3271; H04L 9/0827; H04L 2209/805; H04L 2209/603

USPC ......... 726/1–21; 713/168, 193, 194, 189, 182
See application file for complete search history.

(56) References Cited

U.S. PATENT DOCUMENTS

| 5,910,989 | A  | * | 6/1999  | Naccache ..................... 713/173 |
| 6,336,585 | B1 | * | 1/2002  | Harada ......................... 235/380 |
| 6,466,668 | B1 |   | 10/2002 | Miyazaki et al.              |
| 7,107,458 | B2 |   | 9/2006  | Oishi et al.                 |

(Continued)

FOREIGN PATENT DOCUMENTS

| CN | 101874244 | 10/2010 |
| KR | 100827882 | 5/2008  |

(Continued)

OTHER PUBLICATIONS

European Search Report dated Apr. 7, 2015 issued in counterpart application No. 12789924.3-1870.

(Continued)

*Primary Examiner* — Don Zhao
(74) *Attorney, Agent, or Firm* — The Farrell Law Firm, P.C.

(57) ABSTRACT

An apparatus and method for authenticating a Non-Volatile Memory (NVM) device are provided. A host device that authenticates the NVM device transmits challenge information for authentication to the NVM device, receives pieces of authentication information in response to the challenge information from the NVM device, and authenticates the NVM device using the pieces of authentication information by the host device. The pieces of authentication information are generated based on the challenge information and secret key information stored in the NVM device.

19 Claims, 9 Drawing Sheets

(56) References Cited

U.S. PATENT DOCUMENTS

| | | | |
|---|---|---|---|
| 7,983,421 B2* | 7/2011 | Chandrasekaran et al. | 380/277 |
| 2001/0025344 A1* | 9/2001 | Teglia | 713/200 |
| 2003/0053358 A1* | 3/2003 | Kundu et al. | 365/201 |
| 2003/0105967 A1* | 6/2003 | Nam | 713/189 |
| 2007/0094161 A1* | 4/2007 | Calabro et al. | 706/13 |
| 2007/0192603 A1* | 8/2007 | Ishiguro et al. | 713/169 |
| 2008/0082826 A1* | 4/2008 | Ahlquist | 713/176 |
| 2008/0183999 A1* | 7/2008 | Balinsky et al. | 711/163 |
| 2008/0263362 A1* | 10/2008 | Chen | 713/184 |
| 2009/0138727 A1* | 5/2009 | Campello de Souza | 713/193 |
| 2009/0158055 A1 | 6/2009 | Nowottnick et al. | |
| 2009/0193000 A1* | 7/2009 | Ramzan et al. | 707/3 |
| 2009/0196423 A1* | 8/2009 | Chandrasekaran et al. | 380/277 |
| 2009/0219559 A1 | 9/2009 | Lee et al. | |
| 2010/0042545 A1* | 2/2010 | Ogg et al. | 705/60 |
| 2010/0153672 A1* | 6/2010 | Jogand-Coulomb et al. | 711/164 |
| 2010/0162352 A1* | 6/2010 | Haga et al. | 726/2 |
| 2010/0228986 A1* | 9/2010 | Robshaw et al. | 713/182 |
| 2010/0268953 A1* | 10/2010 | Matsukawa | G06F 21/10 713/171 |
| 2011/0081016 A1 | 4/2011 | Kargl | |
| 2011/0270525 A1* | 11/2011 | Hunter | 702/6 |

FOREIGN PATENT DOCUMENTS

| | | |
|---|---|---|
| KR | 100997239 | 11/2010 |
| WO | WO 2009/059331 | 5/2009 |

OTHER PUBLICATIONS

Chinese Office Action dated Jul. 2, 2015 issued in counterpart application No. 201280025360.6, 27 pages.

* cited by examiner

METHOD AND APPARATUS FOR AUTHENTICATING A NON-VOLATILE MEMORY DEVICE

PRIORITY

This application claims priority under 35 U.S.C. §119(a) to Korean Patent Application Serial No. 10-2011-0048634, which was filed in the Korean Intellectual Property Office on May 23, 2011, the entire content of which is incorporated herein by reference.

BACKGROUND OF THE INVENTION

1. Field of the Invention

The present invention relates generally to a method and apparatus for authenticating a Non-Volatile Memory (NVM) device.

2. Description of the Related Art

To protect content, techniques such as Digital Rights Management (DRM), copy protection, etc., are used. Other techniques authenticate memory devices including an NVM device, such as a Solid State Disk (SSD), a flash memory card, a Secure Digital (SD) card, a MultiMedia Card (MMC), or a Universal Serial Bus (USB) device.

Although DRM, Content Protection for Recordable Media (CPRM) for SD cards, and Advanced Access Content System (AACS) for blue-ray disks provide device authentication methods based on Public Key Infrastructure (PKI) or other cryptographic technologies, these techniques cannot protect against attacks such as duplication of a memory device or authentication of an unauthorized storage medium by a legitimate player.

For device authentication methods based on CPRM or AACS, an IDentifier (ID) is stored in a read-only area of a storage medium during fabrication of the storage medium. The stored ID is then used for device authentication and content protection through an encryption scheme. A major drawback with these types of device authentication methods is that illegal hardware manufacturers can easily clone a number of authenticated devices.

However, there is no specified conventional method for allowing a host device to directly authenticate an NVM device. Accordingly, a controller performs an Error Correction Code (ECC) function and a medium authentication function for an NVM device, which passively provides a data storage space.

FIG. 1 is a block diagram illustrating a conventional host device and medium device, which performs medium authentication using a controller.

Referring to FIG. 1, a conventional medium device 20 includes an NVM device 22 that stores information and a controller 21, which inputs and outputs data to and from the NVM device 22 and controls the NVM device 22. Accordingly, the controller 21 controls an ECC function for the NVM device 22. A host device 10, which uses the medium device 20, performs medium authentication on the medium device 20 through an authentication verification module 11. The controller 21 includes a Flash Translation Layer (FTL), the ECC module, and a security module.

However, especially as the integration of a flash memory has increased from a cell being able to store 1 bit (a single-level cell), 2 bits (a multi-level cell), and then 3 bits (a triple-level cell), many more errors are generated. In this context, robust ECC performance is required. Nonetheless, most current memory devices rely on separate a controller for the ECC function, and inclusion of the ECC function in NVM devices as an authentication mechanism may significantly increase production costs.

SUMMARY OF THE INVENTION

The present invention is designed to address at least the problems and/or disadvantages described above and to provide at least the advantages described below.

Accordingly, an aspect of the present invention is to provide a method and apparatus for authenticating an NVM device that provides a reliable ECC function without additional ECC components.

In accordance with an embodiment of the present invention, a method for authenticating an NVM device is provided. The method includes transmitting, by the host device, challenge information for authentication to the NVM device; receiving, by the host device, pieces of authentication information from the NVM device, in response to the challenge information; and authenticating, by the host device, the NVM device using the pieces of authentication information. The pieces of authentication information are generated based on the challenge information and secret key information stored in the NVM device.

In accordance with another embodiment of the present invention, a host device is provided for authenticating an NVM device. The host device includes an interface for interfacing data communication with the NVM device; and an authentication verification module for transmitting challenge information for authentication to the NVM device through the interface, receiving pieces of authentication information in response to the challenge information from the NVM device through the interface, and authenticating the NVM device using the pieces of authentication information. The pieces of authentication information are generated based on the challenge information and secret key information stored in the NVM device.

In accordance with another embodiment of the present invention, a method for authenticating an NVM device is provided. The method includes receiving, by the NVM device, challenge information for authentication from a host device; generating, by the NVM device, pieces of authentication information using the challenge information and secret key information stored in the NVM device; and transmitting, by the NVM device, the pieces of authentication information to the host device, in response to the challenge information.

In accordance with another embodiment of the present invention, an NVM device is provided. The NVM device includes a protected area including secret key information for generating authentication information and header information; an interface for receiving challenge information for authentication from a host device; and an authentication information generator for generating pieces of authentication information using the challenge information and the secret key information. The interface transmits the pieces of authentication information to the host device in response to receiving the challenge information.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In accordance with an embodiment of the present invention, a method is provided for a host device to authenticate an NVM device. More specifically, reliability is granted to authentication information by allowing a host device to acquire the authentication information as many times as the host device can guarantee reliability for the authentication information and verify the authentication information, without including a reliability granting component into an NVM device. Accordingly, the host device can independently authenticate an NVM device regarding functions such as ECC function.

Herein, the term "NVM device" refers to a storage medium that retains stored information indefinitely even upon power-off, like a NAND or NOR flash memory, an SSD, an MMC, or a USB device. Additionally, an NVM device may also be a built-in storage medium, embedded in a host device.

Figure 2:
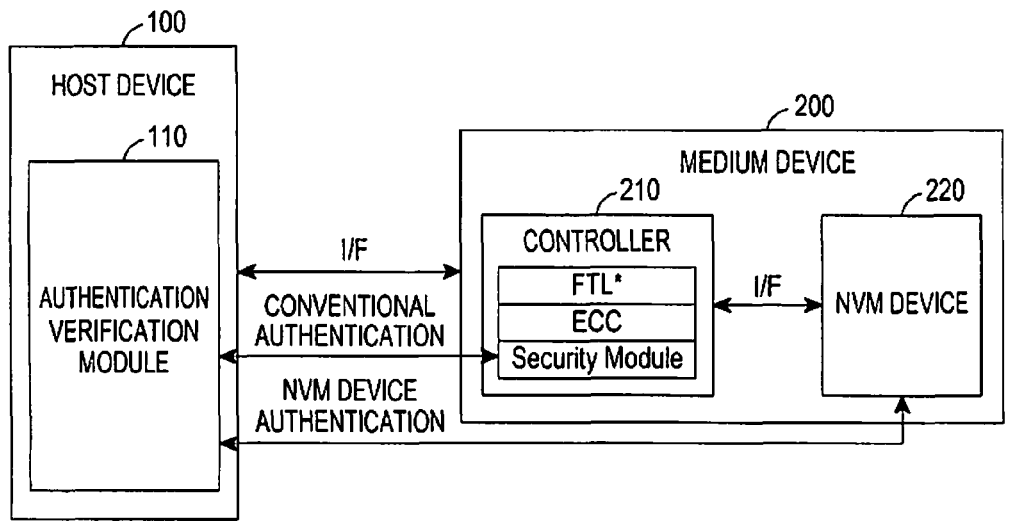
FIG. 2 is a block diagram illustrating a host device and medium device, which authenticate an NVM device according to an embodiment of the present invention.

FIG. 2 is a block diagram illustrating a host device and medium device, which authenticate an NVM device according to an embodiment of the present invention.

Figure 1:
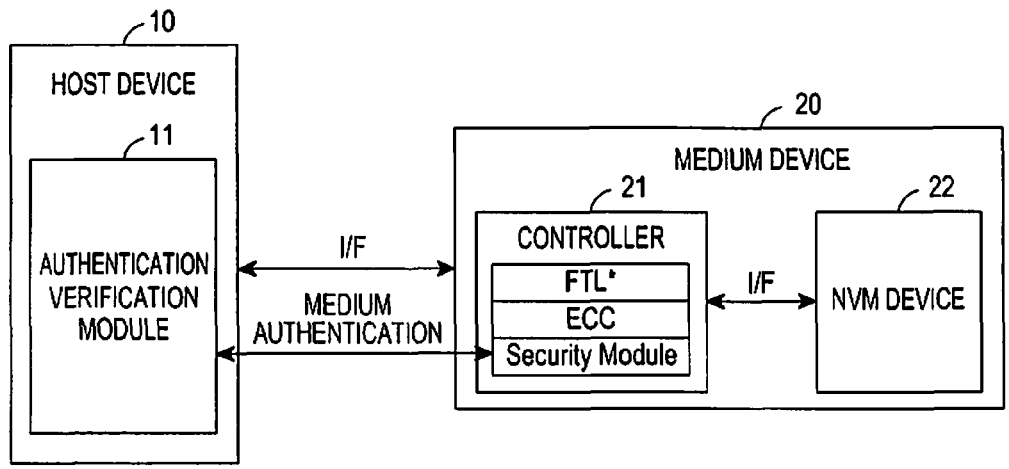
FIG. 1 is a block diagram illustrating a conventional host device and medium device, which performs medium authentication using a controller.

Referring to FIG. 2, a host device 100 includes an authentication verification module 110 that directly authenticates an NVM device in a medium device 200 without use of an additional controller, as describe in FIG. 1. Additionally, the medium device 200 may still perform the conventional method for authenticating the NVM device 220 through a controller 210.

Figure 3:
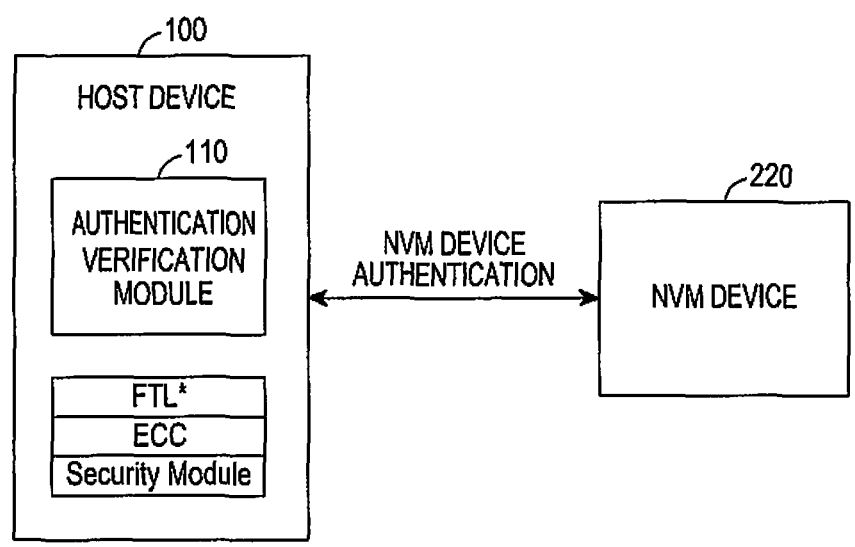
FIG. 3 is a block diagram illustrating a host device for authenticating an embedded NVM device according to an embodiment of the present invention.

FIG. 3 is a block diagram illustrating a host device for authenticating an embedded NVM device according to an embodiment of the present invention.

Referring to FIG. 3, when an NVM device 220 without a controller is embedded in the host device 220, the NVM device 220 can also be directly authenticated by the authentication verification module 110.

Figure 4A:
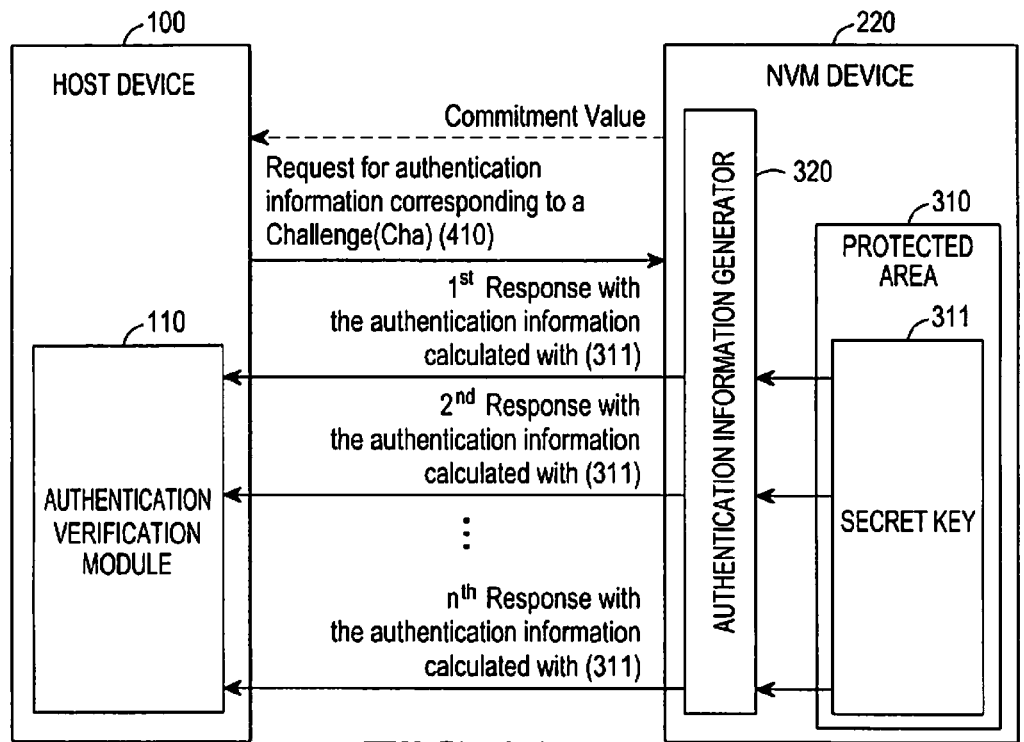
FIGS. 4A and 4B are signal flow diagrams illustrating authentication methods of a host device for authenticating an NVM device according to embodiments of the present invention.
Figure 4B:
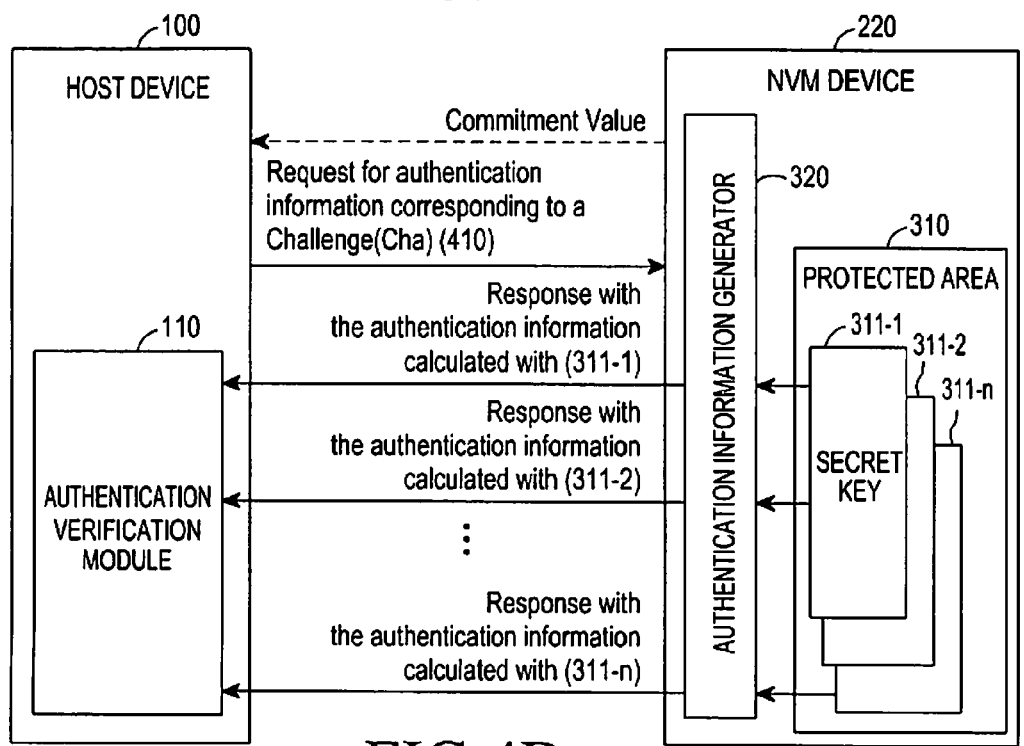

FIGS. 4A and 4B are signal flow diagrams illustrating authentication methods of a host device for authenticating an NVM device according to embodiments of the present invention.

Referring to FIG. 4A, the host device 100 includes the authentication verification module 110 for receiving authentication information from the NVM device 220 and authenticating the NVM device 220 based on the received authentication information. The NVM device 220 includes a protected area 310 for storing important information, e.g., a secret key 311. More specifically, the protected area 310 is an area to which the important information is stored during fabrication of the NVM device 220 and then a storage path is disabled. Therefore, only a read-only command is provided to the protected area 310.

The NVM device 220 further includes an authentication information generator 320 that generates authentication information using the secret key 311 through operations defined in an authentication protocol, such as pseudo-random number generation, encryption, etc. For example, the authentication information generator 320 may be configured with a circuit for generating the authentication information.

In FIGS. 4A and 4B, when the NVM device 220 is authenticated, the NVM device 220 and the host device 100 exchange a commitment value and a challenge value with each other (410). Transmission of the commitment value from the NVM device 220 to the host device 110 is optional.

Subsequently, the NVM device 220 generates authentication information using the secret key 311 according to the authentication protocol and transmits the authentication information to the host device 100. The secret key 311 may be stored in the NVM device 220, as illustrated in FIG. 4A, or a plurality of identical secret keys 311-1 to 311-n may be stored in the NVM device 220, as illustrated in FIG. 4B.

The authentication information generator 320 generates pieces of authentication information 311'1 to 311'-n using the secret key 311 in FIG. 4A or using the plurality of identical secret keys 311-1 to 311-n in FIG. 4B. The authentication verification module 110 of the host device 100 verifies the pieces of authentication information 311'1 to 311'-n. If a certain percentage of the pieces of authentication information have passed verification (e.g., more than 50%), the host device 100 determines that the NVM device 220 has been successfully authenticated.

For example, when the host device 100 acquires and verifies seven pieces of authentication information, and three pieces of authentication information have passed verification while the other four pieces have failed verification, i.e., only 43% of the pieces of authentication information have passed verification, the host device 100 determines that authentication of the NVM device 220 has failed. In the opposite case, when three pieces of authentication information have failed verification while the other four pieces have passed verification, i.e., only 57% of the pieces of authentication information have passed verification, the host device 100 determines that the authentication of the NVM device 220 is successful.

In accordance with another embodiment of the present invention, as another authentication method, bit values of the received pieces of authentication information are checked on a per-digit basis, final authentication information is created by setting a bit value occurring most times in each digit of the received authentication information for the digit, and the final authentication information is verified in order to determine whether the NVM device 220 is successfully authenticated. This method will be described in more detail below with reference to FIG. 8.

Figure 5:
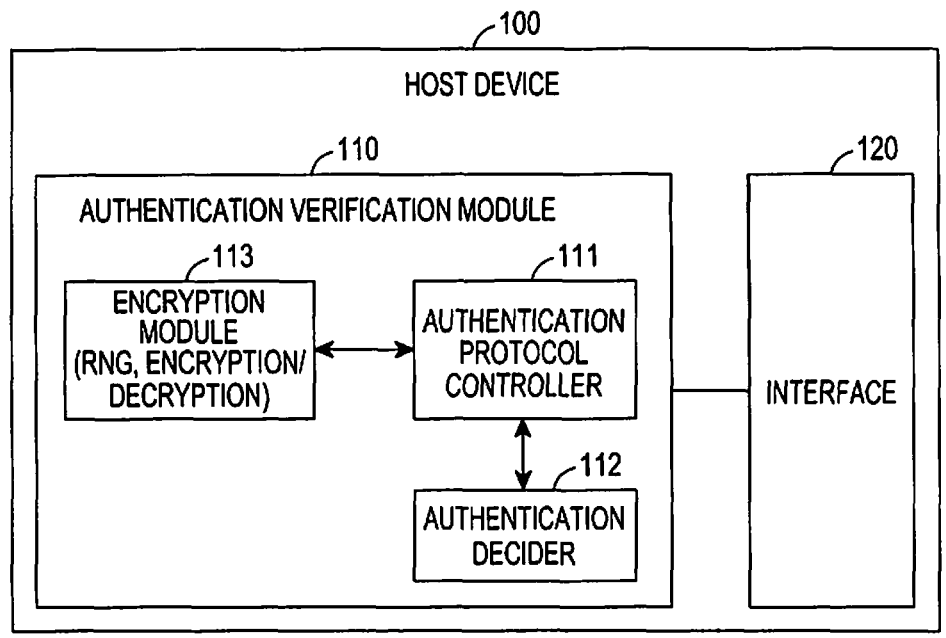
FIG. 5 is a block diagram illustrating a host device for authenticating an NVM device according to an embodiment of the present invention.

FIG. 5 is a block diagram illustrating a host device for authenticating an NVM device according to an embodiment of the present invention.

Referring to FIG. 5, the host device 100 includes an interface 120 for conducting data communication with the NVM device 220 and the authentication verification module 110 for authenticating the NVM device 220. For example, the interface 120 may include at least one of Serial Advanced Technology Attachment (SATA), USB, and SD interfaces.

The authentication verification module 110 includes an authentication protocol controller 111 supporting a plurality of protocols, an encryption module 113 for generating a value used in an authentication protocol, for example, a Random Challenge Value (RNG), and an authentication decider 112 for determining authentication success or failure based on pieces of authentication information received from the NVM device 220.

Specifically, the authentication decider 112 verifies each of the acquired pieces of authentication information, and if a certain percentage of the pieces of authentication information have passed verification, e.g., 50%, or the number of pieces of authentication information that have passed verification is larger than a predetermined threshold, the authentication decider 112 determines that the authentication is successful. Alternatively or additionally, the authentication decider 112 may generate final authentication information having a bit value occurring the most in each digit of the pieces of authentication information as a bit value for the digit and may determine whether the authentication is successful or not by verifying the final authentication information. The authentication decider 112 may make a decision as to authentication success/failure according to an authentication protocol of the authentication protocol controller 111.

The authentication protocol controller 111 may support a plurality of authentication protocols and initiate a specific authentication protocol based on a version number set in a header received from the NVM device 220.

Figure 6:
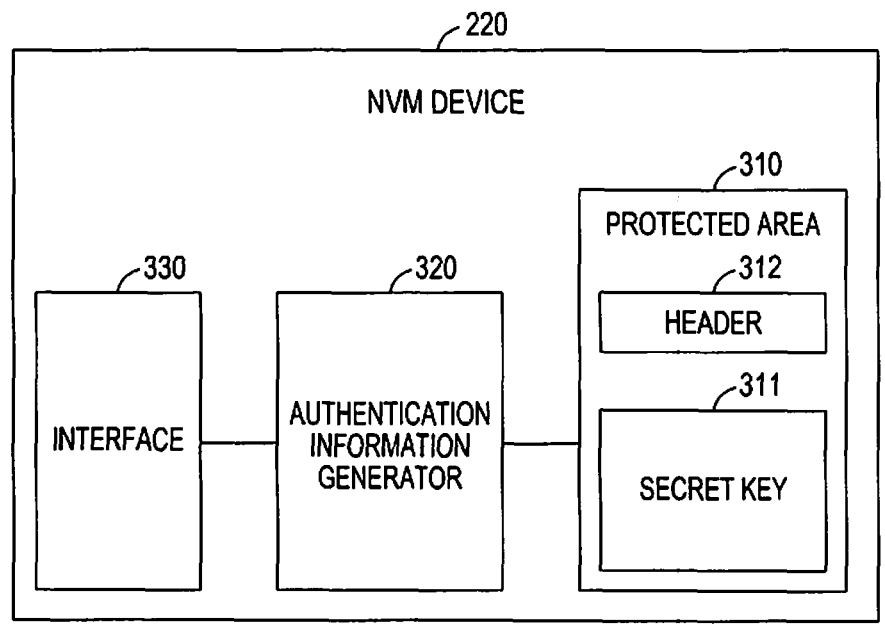
FIG. 6 is a block diagram illustrating an NVM device according to an embodiment of the present invention.

FIG. 6 is a block diagram illustrating an NVM device according to an embodiment of the present invention.

Referring to FIG. 6, the NVM device 220 includes an interface 330 for interfacing data communication with the host device 100 or an external controller, the authentication information generator 320 for generating authentication information using the secret key 311, and the protected area 310, which stores the secret key 311 and a header 312.

The interface 330 may include at least one of embedded MMC (eMMC) and NAND interfaces.

The header 312 may be configured as illustrated in Table 1 below.

TABLE 1

| Items | Description | M/O |
| --- | --- | --- |
| Version Number | Version Number for protocol matching | O |
| Repetition Count | The number of repeated secret keys or the number of pieces of authentication information to be repeatedly checked | M |
| Others | Reserved | O |

Version Number is information with which the host device 100 selects an authentication protocol implemented by the authentication information generator 320 of the NVM device 220 and information related to the authentication protocol. Repetition Count specifies a minimum number of repeated generations of authentication information for verifying the reliability of authentication information of the NVM device 220. Depending on the configuration of the NVM device 220, authentication information may be repeatedly generated as many times as the Repetition Count using the single secret key 311, or if a plurality of secret keys 311-1 to 311-$n$ are stored in the NVM device 220, as many pieces of authentication information as Repetition Count may be generated using the plurality of secret keys 311-1 to 311-$n$. That is, as illustrated in FIG. 4A, if one secret key 311 is stored, the authentication information generator 320 generates as many pieces of authentication information as the Repetition Count by reading the secret key 311 a plurality of times. However, as illustrated in FIG. 4B, if a plurality of secret keys 311-1 to 311-$n$ are stored, the authentication information generator 320 generates as many pieces of authentication information as the Repetition Count by reading each of the secret keys 311-1 to 311-$n$.

For example, the authentication information generator 320 may include a pseudo-random number generator, a uni-directional Hash function (e.g. SHA-1 or MD5), or a lightweight encryption circuit.

Figure 7:
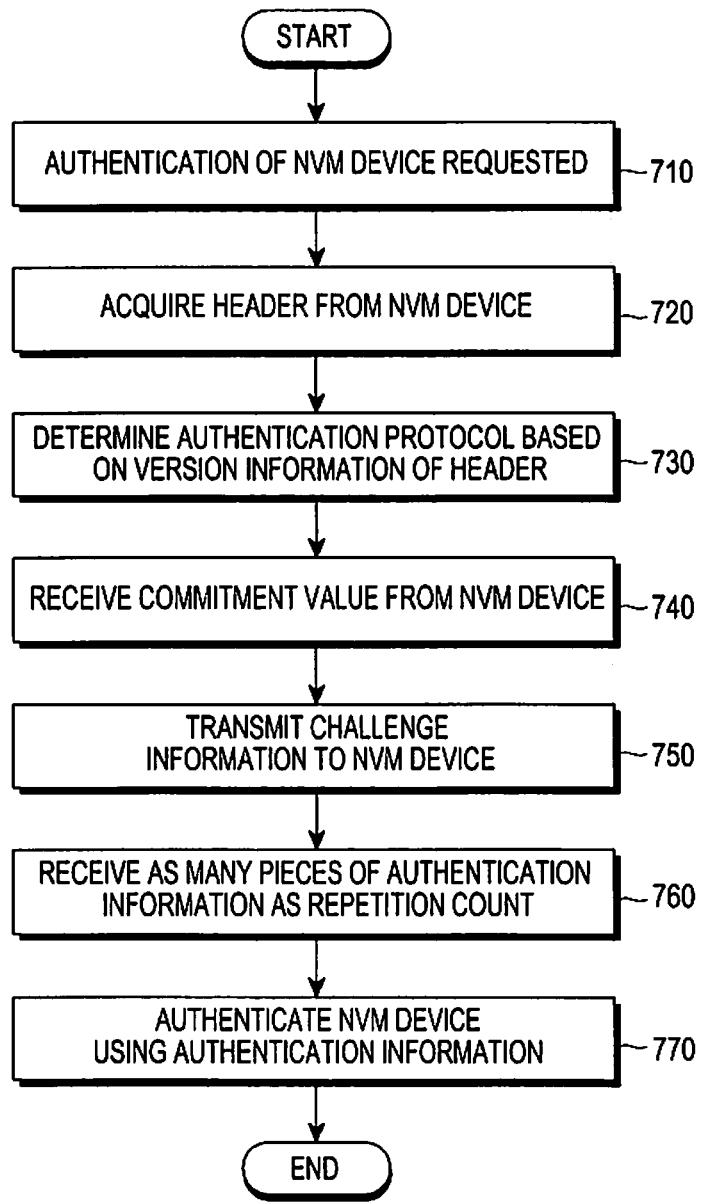
FIG. 7 is a flowchart illustrating a host device method for authenticating an NVM device according to an embodiment of the present invention.

FIG. 7 is a flowchart illustrating a host device method for authenticating an NVM device according to an embodiment of the present invention.

Referring to FIG. 7, upon generation of a request for authenticating the NVM device 220 in the host device 100 in step 710, the authentication verification module 110 of the host device 100 receives a header from the NVM device 220 in step 720. In step 730, the authentication verification module 110 determines an authentication protocol and related parameters based on version information set in the header. The authentication verification module 110 receives commitment information from the NVM device 220 in step 740, which is optional according to an authentication protocol used.

In step 750, the authentication verification module 110 transmits query information, such as challenge information, to the NVM device 220 according to the determined authentication protocol.

In step 760, the authentication verification module 110 acquires as many pieces of authentication information as indicated by a repetition count set in the header from the NVM device 220.

In step 770, the authentication verification module 110 verifies each piece of authentication information. If a certain percentage of the pieces of authentication information have passed verification, e.g., more than 50%, or the number of successfully verified pieces of authentication information exceeds a predetermined threshold, the authentication verification module 110 determines that the NVM device 220 has been authenticated successfully.

Additionally, the authentication verification module 110 may make a decision as to authentication success or failure by checking the bit values of the pieces of authentication information on a per-digit basis, as will be described below with reference to FIG. 8.

Figure 8:
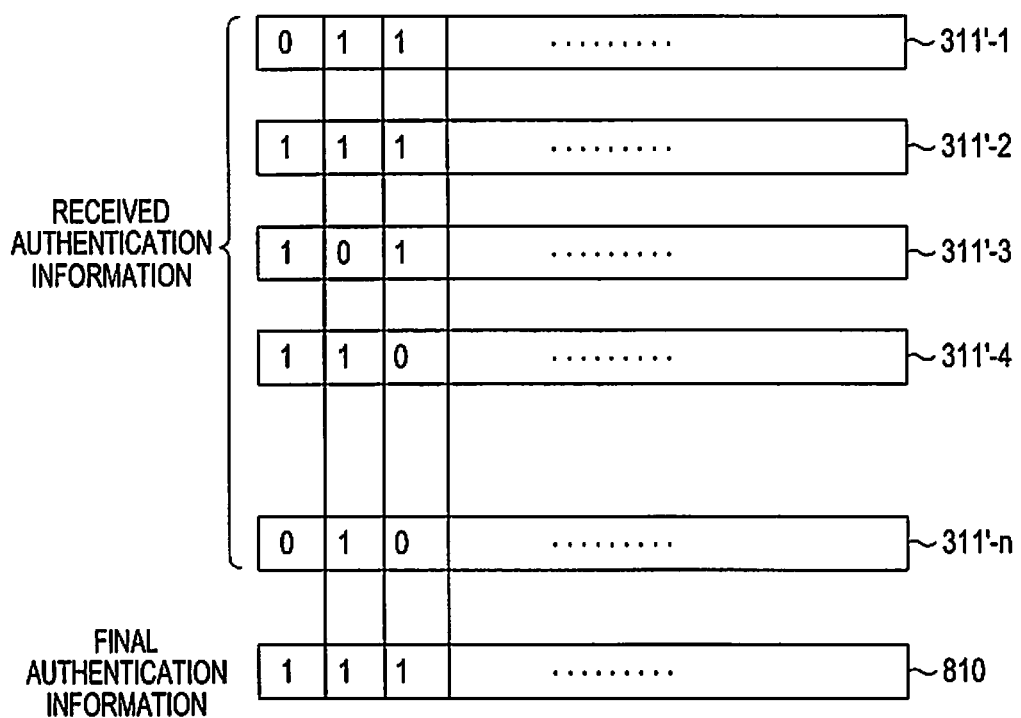
FIG. 8 illustrates received authentication information and final authentication information extracted from the received authentication information, according to an embodiment of the present invention.

FIG. 8 illustrates received authentication information and final authentication information extracted from the received authentication information, according to an embodiment of the present invention. Specifically, FIG. 8 illustrates a pieces of authentication information 311'-1 to 311'-$n$ received by the authentication decider 112 from the NVM device 220, where the received pieces of authentication information were generated based on the single secret key 311 or the plurality of secret keys 311-1 to 311-$n$ stored in the NVM device 220.

Referring to FIG. 8, the authentication decider 112 authenticates the NVM device 220 using the pieces of authentication information 311'-1 to 311'-$n$ received from the NVM device 220. Specifically, the authentication decider 112 selects a bit value that occurs most in each digit of the authentication information 311'-1 to 311'-$n$ and generates final authentication information 810 by setting the selected bit value as a bit value of the digit. For example, the first-digit bit values of the received pieces of authentication information are checked. If there are more 1s than 0s in the first digit, 1 is set as the bit value of the first digit in the final authentication information 810. However, if there are more 0s than is in the first digit, 0 is set as the bit value of the first digit in the final authentication information 810.

In FIG. 8, the pieces of authentication information have more 1s than 0s in each of the first three digits and thus the bit value of each of the first three digits is set to 1 in the final authentication information 810.

Accordingly, the authentication decider 112 generates final authentication information by setting a bit value that occurs most in each digit as a bit value for the digit and determines whether authentication is successful or not by verifying the final authentication information.

Figure 9:
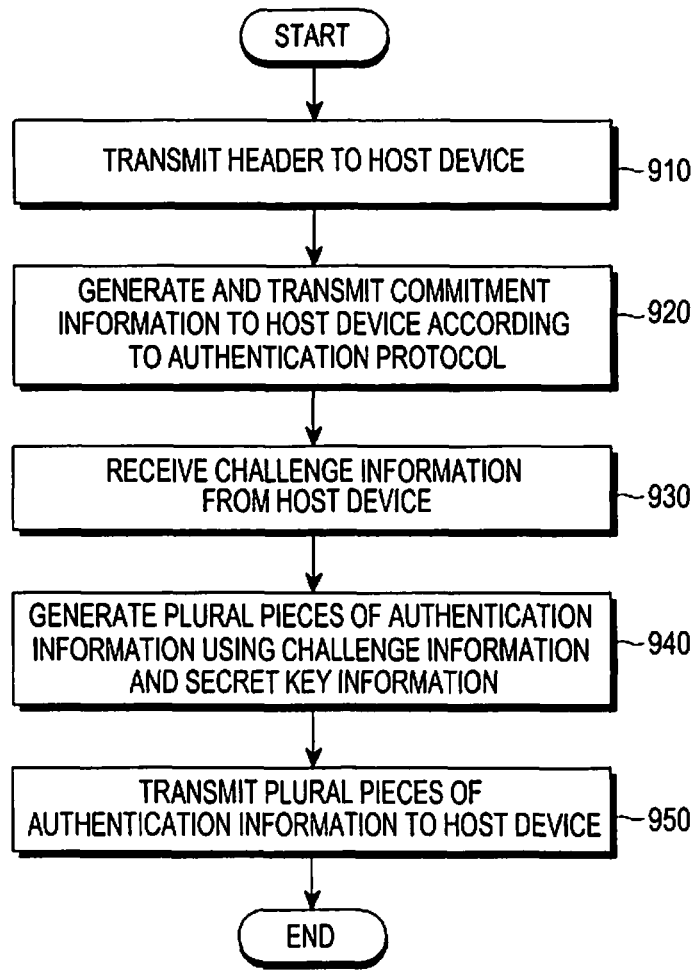
FIG. 9 is a flowchart illustrating an NVM authentication method according to an embodiment of the present invention.

FIG. 9 is a flowchart illustrating an NVM authentication method according to an embodiment of the present invention.

Referring to FIG. 9, the NVM device 220 transmits a header to the host device 100 in step 910.

In step 920, the NVM device 220 generates commitment information and transmits the commitment information to the host device according to an authentication protocol. Step 920 is optional depending on an authentication protocol used.

The NVM device 220 receives challenge information from the host device 100 in step 930 and generates pieces of authentication information based on the challenge information and a secret key in step 940.

In step 950, the NVM device 220 transmits the pieces of authentication information to the host device 100.

In the above-described embodiments of the present invention, pieces of authentication information are generated using the secret key 311 or using the plurality of identical secret keys 311-1 to 311-$n$. In the embodiments of the present invention which will be described below, pieces of authentication information are generated using one of different secret keys 311-1 to 311-$n$ that are stored in the NVM device 220.

Figure 10:
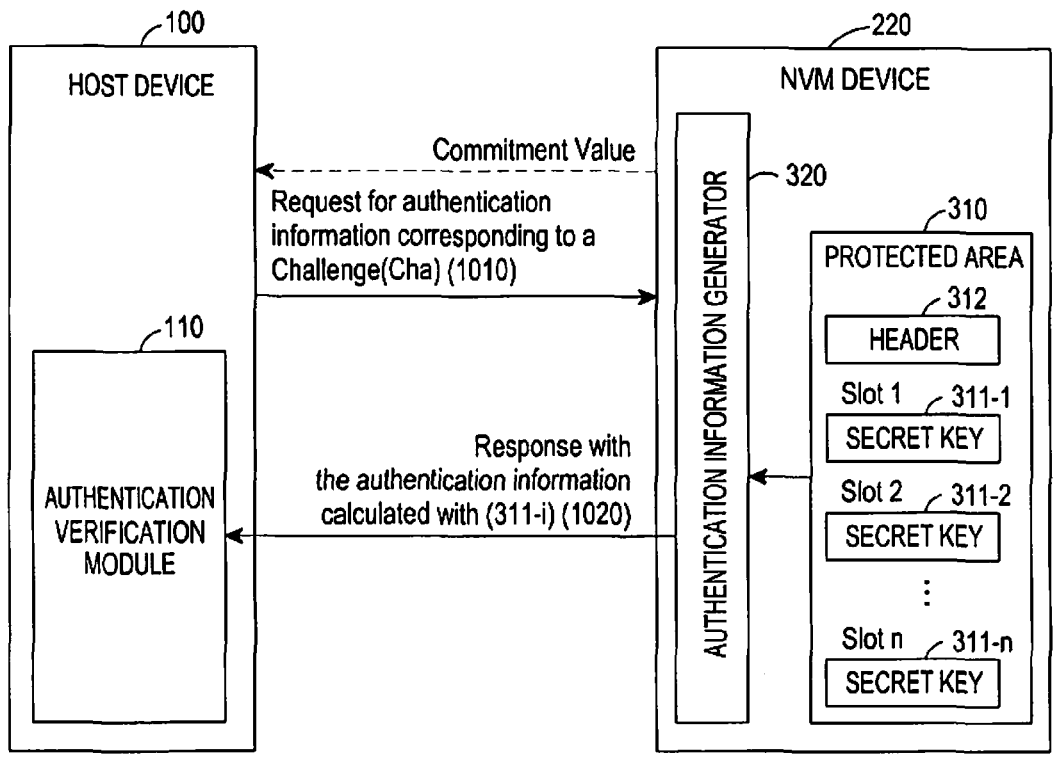
FIG. 10 is a signal flow diagram of an authentication system including an NVM device and a host device for authenticating the NVM device according to an embodiment of the present invention.

FIG. 10 is a signal flow diagram of an authentication system including an NVM device and a host device for authenticating the NVM device according to an embodiment of the present invention. Specifically, the authentication system illustrated in FIG. 10 is similar to the authentication system illustrated in FIG. 4, except that a slot index is assigned to each secret key in the protected area 310 and pieces of authentication information are transmitted in one data frame. Therefore, a redundant description will not be provided herein.

Referring to FIG. 10, to authenticate the NVM device 220, in step 1010, the host device 100 and the NVM device 220 exchange challenge information and commitment information with each other according to an authentication protocol. Again, transmission of the commitment information from the NVM device 220 to the host device 100 may be optional.

The challenge information may include the following values.

Challenge Information=[Slot Index, Random Nonce]

The host device 100 transmits the challenge information including a slot index and a random nonce (i.e., a random challenge value) to the NVM device 220. The host device 100 selects a slot index i from among slot indexes 1 to n assigned to first to $n^{th}$ secret keys stored in the NVM device 220. Herein, n is a natural number and i is a natural number ranging from 1 to n. That is, the slot indexes are serial numbers that identify the plurality of secret keys 311-1 to 311-$n$.

The NVM device 220 stores the $1^{st}$ to $n^{th}$ different secret keys 311-1 to 311-$n$ in the protected area 310 and the $1^{st}$ to $n^{th}$ secret keys 311-1 to 311-$n$ correspond to the slot indexes 1 to n, respectively.

The authentication information generator 320 generates as many pieces of authentication information as a repetition count set in the header 312 using a secret key with the slot index i, i.e., an $i^{th}$ secret key 311-$i$ indicated by the host device 100, that is, $1^{st}$ to $j^{th}$ authentication information 311'-1 to 311'-$j$. Here, j is a natural number ranging from 1 to n, equal to the value of the repetition count. In step 1020, the authentication information generator 320 transmits the $1^{st}$ to $j^{th}$ authentication information 311'-1 to 311'-$j$ in one data frame to the host device.

Figure 11:
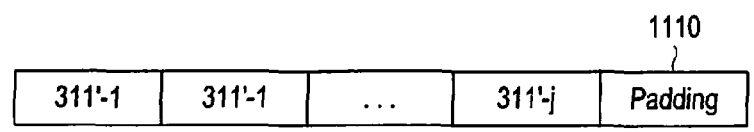
FIG. 11 illustrates a data frame including authentication information according to an embodiment of the present invention.

FIG. 11 illustrates a data frame including authentication information according to an embodiment of the present invention.

Referring to FIG. 11, a data frame 1100 of a predetermined length includes first to $j^{th}$ authentication information 311'-1 to 311'-$j$. If the data frame 1100 is not filled up, padding data 1110 being a bit stream of a predetermined pattern is added to the end of the data frame 1100 according to a predetermined padding method.

Figure 12:
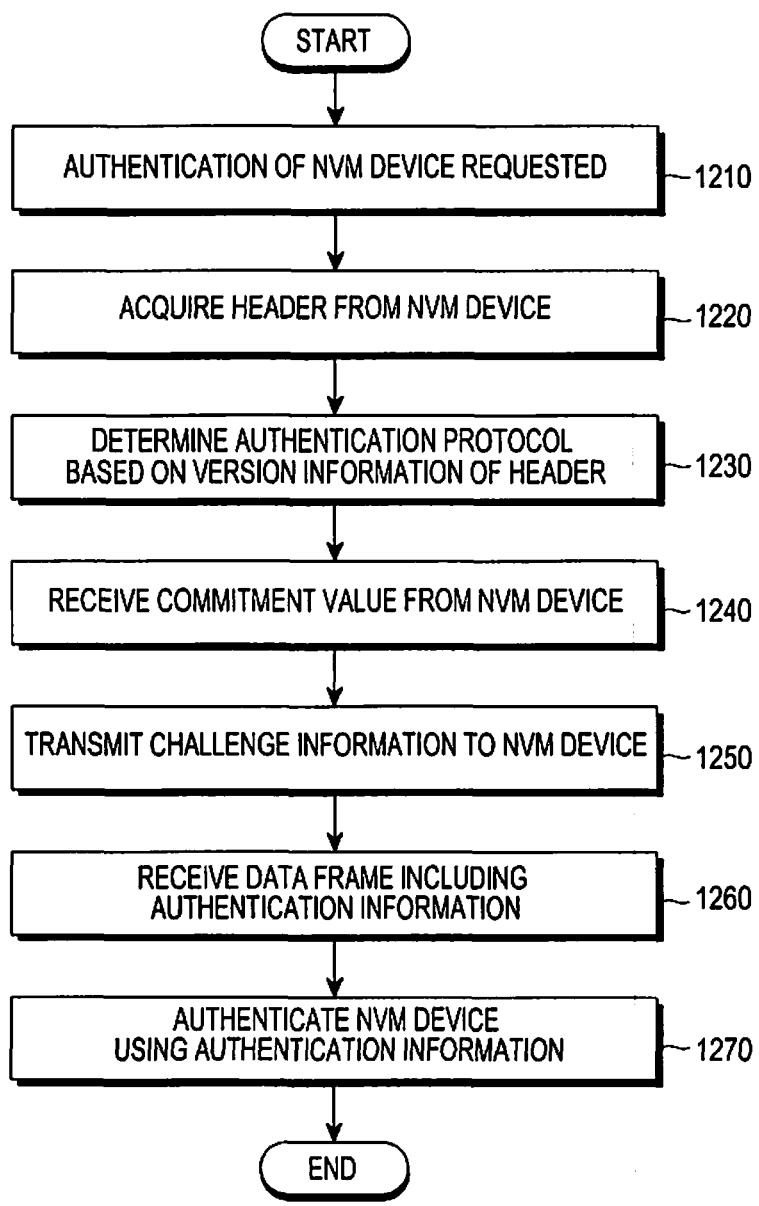
FIG. 12 is a flowchart illustrating a host device method for authenticating an NVM device according to an embodiment of the present invention.

FIG. 12 is a flowchart illustrating a host device method for authenticating an NVM device according to an embodiment of the present invention.

Referring to FIG. 12, a request for authenticating the NVM device 220 is generated in the host device 100 in step 1210. For example, the authentication request may be generated when the host device 100 automatically senses the NVM device 220 without intervention of a user or the user inputs a command to access the NVM device 220 to the host device 100.

In step 1220, the authentication verification module 110 of the host device 100 receives the header 312 from the NVM device 220. For example, a repetition count may be set to 4 in the header 312.

In step 1230, the authentication protocol controller 111 of the host device 100 determines an authentication protocol and related parameters based on version information included in the header 312.

In step 1240, the host device 100 receives commitment information from the NVM device 220. Again, the operation in step 1240 may be optional according to an authentication protocol that is used.

In step 1250, the authentication protocol controller 111 of the host device 100 transmits query information, e.g., challenge information, to the NVM device 220 according to the determined authentication protocol. For example, the challenge information may include the following values.

Challenge Information=[Slot Index, Random Nonce]=[1, Random Nonce]

In step 1260, the authentication verification module 110 of the host device 100 acquires as many pieces of authentication information as indicated by the repetition count from the NVM device 220.

More specifically, the authentication information generator 320 of the NVM device 220 generates as many pieces of authentication information 311'-1 to 311'-j as indicated by the repetition count set in the header 312 using a secret key 311 with a slot index indicated by the host device 100 and the random nonce of the challenge information. The authentication information generator 320 may generate the pieces of authentication information 311'-1 to 311'-j using its generated second random nonce in addition to the secret key 311 and the random nonce of the challenge information. For example, the authentication information generator 320 may generate first to fourth pieces of authentication information 311'-1 to 311'-4 based on a repetition count of 4 set in the header 312 using a secret key with slot index 1, i.e., the first secret key 311-1 and the random nonce of the challenge information.

The authentication information generator 320 generates a data frame including the pieces of authentication information 311'-1 to 311'-j and transmits the data frame to the host device 100 through the interface 330.

The authentication decider 112 of the host device 100 receives the data frame from the NVM device 220 through the interface 120.

In step 1270, the authentication decider 112 of the host device 100 verifies each piece of authentication information 311'-1 to 311'-j included in the received data frame. If a certain percentage or more than a predetermined number of pieces of authentication information passes verification, the authentication decider 112 determines that the NVM device 220 has been authenticated successfully. Additionally, the authentication decider 112 may make a decision as to authentication success or failure by checking the bit values of the pieces of authentication information on a per-digit basis, as described above with reference to FIG. 8.

For example, when the authentication decider 112 verifies each of the first to fourth authentication information 311'-1 to 311'-4 and three out of the four pieces of authentication information 311'-1 to 311'-4 pass verification, the authentication decider 112 determines that the NVM device 220 has been authenticated successfully.

As is apparent from the above-described embodiment of the present invention, a host device authenticates an NVM device using pieces of authentication information received from the NVM device, without adding an ECC component to the NVM device. Accordingly, an NVM device without an independent error correction function (ECC component) can be authenticated, thereby reducing cost of the NVM device.

The above-described embodiments of the present invention can be implemented in hardware, software, or a combination of hardware and software. The software can be recorded to a volatile or non-volatile storage device such as a Read Only Memory (ROM), to a memory such as a Random Access Memory (RAM), a memory chip, a memory device, or an integrated circuit, or to a storage medium that is optically or magnetically recordable and readable by a machine (e.g., a computer), such as a Compact Disc (CD), a Digital Versatile Disc (DVD), a magnetic disk, or a magnetic tape. The storage included in the host device is an example of a machine-readable storage medium suitable for storing a program or programs including instructions to implement the embodiments of the present invention. Accordingly, the present invention includes a program including a code for implementing the apparatus or method as appended in the claims and a machine-readable storage medium that stores the program. The program may be transferred electronically through any medium such as a communication signal transmitted through a wired or wireless connection and the present invention embraces equivalents thereof.

In addition, the host device can receive and store the program from a program providing device connected to the host device wirelessly or by cable. The program providing device may include a program with instructions that make the host device perform a preset content protection method, a memory for storing information needed for the content protection method, a communication unit for conducting a wired or wireless communication with the host device, and a controller for transmitting the program to the host device upon request of the host device or automatically.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for authenticating a memory device by a host device, the method comprising:
   sending, by the host device via a hardware interface for interfacing data communication with the memory device, a random number and a slot number to the memory device, wherein the slot number corresponds to a secret key of a plurality of secret keys stored in the memory device;
   receiving, by the host device, authentication information data from the memory device, wherein the authentication information data is generated through a calculation by the memory device using at least the random number and the secret key corresponding to the slot number; and
   authenticating the memory device, by the host device, based at least in part on the authentication information data,
   wherein the slot number is selected by the host device from among a plurality of slot numbers corresponding to the plurality of secret keys which are previously stored in a read-only area of the memory device.

2. The method of claim 1, wherein the authentication information data includes pieces of authentication information, and the pieces of authentication information are received in one data frame.

3. The method of claim 2, wherein the authenticating of the memory device comprises:
   verifying each of the pieces of authentication information; and
   determining that the authenticating of the memory device is successful, if a number of pieces of successfully verified authentication information exceeds a predetermined threshold.

4. The method of claim 2, wherein the authenticating of the memory device comprises:
   setting a bit value by checking bits occurring most times in each digit of the pieces of authentication information for generating final authentication information; and
   authenticating the memory device based on the final authentication information.

5. The method of claim 2, further comprising:
   receiving, by the host device, header information from the memory device, wherein a number of the pieces of authentication information is equal to a repetition count set in the header information.

6. The method of claim 1, wherein the memory device stores content to be protected.

7. A host device for authenticating a memory device, the host device comprising:
an authentication verification module including a controller supporting at least one authentication protocol, the authentication verification module configured to:
send, via a hardware interface for interfacing data communication with the memory device, a random number and a slot number to the memory device, wherein the slot number corresponds to a secret key of a plurality of secret keys stored in the memory device,
receive authentication information data from the memory device, wherein the authentication information data is generated through a calculation by the memory device using at least the random number and the secret key corresponding to the slot number, and
authenticating the memory device based at least in part on the authentication information data,
wherein the slot number is selected by the host device from among a plurality of slot numbers corresponding to the plurality of secret keys which are previously stored in a read-only area of the memory device.

8. The host device of claim 7, wherein the authentication information data includes pieces of authentication information, and the pieces of authentication information are received in one data frame.

9. The host device of claim 8, wherein the authentication verification module verifies each of the pieces of authentication information, and determines that the memory device is successfully authenticated, when a number of pieces of successfully verified authentication information exceeds a predetermined threshold.

10. The host device of claim 8, wherein the authentication verification module sets a bit value by checking bits occurring most times in each digit of the pieces of authentication information for generating final authentication information, and authenticates the memory device based on the final authentication information.

11. The host device of claim 8, wherein the authentication verification module receives header information from the memory device and determines which authentication protocol to use among the at least one authentication protocol which is supported using the header information.

12. The host device of claim 11, wherein a number of the pieces of authentication information is equal to a repetition count set in the header information.

13. The host device of claim 7, wherein the memory device stores content to be protected.

14. A method for authenticating by a memory device, the method comprising:
receiving, by the memory device via a hardware interface for interfacing data communication with a host device, a random number and a slot number from the host device, wherein the slot number corresponds to a secret key of a plurality of secret keys stored in the memory device;
generating, by the memory device, authentication information data through a calculation by the memory device using at least the random number and the secret key corresponding to the slot number; and
sending, by the memory device, the authentication information data to the host device,
wherein the slot number is selected by the host device from among a plurality of slot numbers corresponding to the plurality of secret keys which are previously stored in a read-only area of the memory device.

15. The method of claim 14, wherein the authentication information data includes pieces of authentication information, and a number of the pieces of authentication information is equal to a repetition count set in header information stored in the memory device.

16. The method of claim 14, wherein the memory device stores content to be protected.

17. A memory device comprising:
a protected area storing a plurality of secret keys; and
a hardware interface for communication between the memory device and a host device,
wherein the memory device is configured to:
receive a random number and a slot number from the host device, wherein the slot number corresponds to a secret key of the plurality of secret keys stored in the protected area;
generate authentication information data through a calculation by the memory device using at least the random number and the secret key corresponding to the slot number; and
send the authentication information data to the host device,
wherein the slot number is selected by the host device from among a plurality of slot numbers corresponding to the plurality of secret keys which are previously stored in a read-only area of the memory device.

18. The memory device of claim 17, wherein the authentication information data includes pieces of authentication information, and a number of the pieces of authentication information is equal to a repetition count set in header information.

19. The memory device of claim 17, wherein the memory device stores content to be protected.

* * * * *